(12) United States Patent
Tan et al.

(10) Patent No.: US 9,612,703 B2
(45) Date of Patent: Apr. 4, 2017

(54) TOP MOUNT CLICKPAD MODULE

(71) Applicant: SYNAPTICS INCORPORATED, San Jose, CA (US)

(72) Inventors: Yeh-Cheng Tan, Taipei (TW); Chia-Ling Hung, Taipei (TW)

(73) Assignee: Synaptics Incorporated, San Jose, CA (US)

( * ) Notice: Subject to any disclaimer, the term of this patent is extended or adjusted under 35 U.S.C. 154(b) by 164 days.

(21) Appl. No.: 14/588,041

(22) Filed: Dec. 31, 2014

(65) Prior Publication Data

US 2016/0188048 A1    Jun. 30, 2016

(51) Int. Cl.
| | | |
|---|---|---|
| *G06F 3/041* | (2006.01) | |
| *G06F 3/044* | (2006.01) | |
| *G06F 3/047* | (2006.01) | |

(52) U.S. Cl.
CPC .............. *G06F 3/047* (2013.01); *G06F 3/044* (2013.01)

(58) Field of Classification Search
CPC ............. G06F 3/03547; G06F 3/04886; G06F 1/1616; G06F 1/169; G06F 3/041; G06F 3/044; G06F 2203/04105; G06F 1/1626; G06F 3/0395; H01H 13/85; H03K 17/9622; H03K 2217/960745; H03K 2217/960755
USPC ................................. 345/168, 169, 173–174
See application file for complete search history.

(56) References Cited

U.S. PATENT DOCUMENTS

| | | | | |
|---|---|---|---|---|
| 2007/0236473 A1* | 10/2007 | Hong | .................... | G06F 1/1616 345/173 |
| 2010/0079404 A1* | 4/2010 | Degner | ............... | G06F 3/03547 345/174 |
| 2010/0139990 A1* | 6/2010 | Westerman | ............. | G06F 3/017 178/18.03 |
| 2010/0328234 A1* | 12/2010 | Lu | ........................... | G06F 3/044 345/173 |
| 2012/0314347 A1* | 12/2012 | Zhang | ..................... | G06F 1/169 361/679.1 |
| 2013/0050099 A1* | 2/2013 | Hirano | .................... | G06F 1/169 345/173 |
| 2013/0234938 A1* | 9/2013 | Xue | ........................ | G06F 1/169 345/158 |
| 2014/0035866 A1* | 2/2014 | Tan | ........................ | G06F 3/044 345/174 |
| 2015/0185769 A1* | 7/2015 | Takata | .................. | G06F 3/0338 345/173 |

* cited by examiner

*Primary Examiner* — Hong Zhou
(74) *Attorney, Agent, or Firm* — Osha Liang LLP

(57) ABSTRACT

An input device for use with an electronic system of the type including a substantially planar deck having a basin extending downwardly from the deck and comprising at least one slot. The input device includes: a downwardly deflectable component including an input surface configured to be touched by input objects and a capacitive sensor layer configured to sense positional information of the input objects; a hinge having a first hinged component comprising at least one pad coupled to a bottom surface of the deflectable component, a second hinged component configured to be secured to the basin, and at least one tab configured to be inserted into the at least one slot; and an actuation element disposed between the first and second hinged components and configured to detect deflection of the deflectable component in response to force applied to the input surface by an input object.

20 Claims, 7 Drawing Sheets

TOP MOUNT CLICKPAD MODULE

TECHNICAL FIELD

The present invention generally relates to input devices for electronic systems, and more particularly to top-mountable click pads for determining positional and force information for input objects.

BACKGROUND

Input devices including proximity sensor devices (also commonly called touchpads or touch sensor devices) are widely used in a variety of electronic systems. A proximity sensor device typically includes a sensing region, often demarked by a surface, in which the proximity sensor device determines the presence, location and/or motion of one or more input objects. Proximity sensor devices may be used to provide user interfaces for the electronic system. For example, proximity sensor devices are often used as input devices for larger computing systems (such as opaque touchpads integrated in, or peripheral to, notebook, laptop, and tablet computers). Proximity sensor devices are also often used in smaller computing systems (such as touch screens integrated in cellular phones).

Some input devices also have the ability to detect force applied to a sensing surface in addition to determining positional information. For example, Degner U.S. Patent Application Publication No. 2010/0079404 discloses an input device having a touch-sensitive track pad capable of detecting an X-Y position of an input object proximate the track pad, as well as a movement indicator for detecting movement of the movable track pad. Thus, a user can press down and "click" the pad to simulate a button press. FIG. 3B of Degner illustrates a clickable input pad configured for uniform translation; that is, the entire input surface deflects uniformly regardless of the X-Y location of the applied force. FIGS. 3C and 5 of Degner illustrate a hinged pad which pivots about a hinge, and deflects much like an aileron or door.

Both hinged and uniform clickable pads typically employ a mechanical or electronic switch, such as a rubber or metal domed tact switch, to detect movement of the pad to perform a button click, as well as a spring mechanism to restore the pad to its nominal position following a button click.

Presently known clickable input pads are limited in that the area designated for button clicks tends to limit the area available for proximity sensing. In addition, rigidity of the keyboard deck into which the click pad is mounted is reduced by the presence of the mounting hole. Moreover, a supplemental stiffening layer is typically needed to support the cyclic bending and restoration of glass reinforced epoxy laminate (FR4) or polyethylene terephthalate (PET) circuit boards used in presently known input devices, which increases the cost and complexity of the devices. Devices and methods are therefore needed which overcome these shortcomings.

BRIEF SUMMARY

The embodiments of the present invention provide a device and method that facilitates improved device usability. Specifically, the device and method provide improved user interface functionality by facilitating user input with input objects using a top mountable click pad module which may be installed into a basin formed within a keyboard deck of an electronic system. The click pad module includes one or more tabs which may be slid into corresponding slots formed in the basin, and secured within the basin using a single fastener.

According to various embodiments, a hinged input device is capable of simulating a button click. The button click, particularly when combined with the positional information, may be used to provide a wide range of user interface functionality and flexibility.

BRIEF DESCRIPTION OF DRAWINGS

Preferred exemplary embodiments will hereinafter be described in conjunction with the appended drawings, where like designations denote like elements, and.

DETAILED DESCRIPTION

The following detailed description is merely exemplary in nature and is not intended to limit the invention or the application and uses of the invention. Furthermore, there is no intention to be bound by any expressed or implied theory presented in the preceding technical field, background, brief summary or the following detailed description.

Various embodiments of the present invention provide input devices and methods that facilitate improved usability by providing an improved click pad which simulates a button press when the input pad surface is deflected downwardly by an input object. By providing a keyboard deck of an electronic system with a recess having slots with overhanging eves, and by providing a click pad module with tabs aligned with the slots, the click pad module may be installed from the top of the deck, and secured with minimal labor and hardware, for example, with a single screw which secures the bottom of the click pad to the bottom of the basin.

Figure 1:
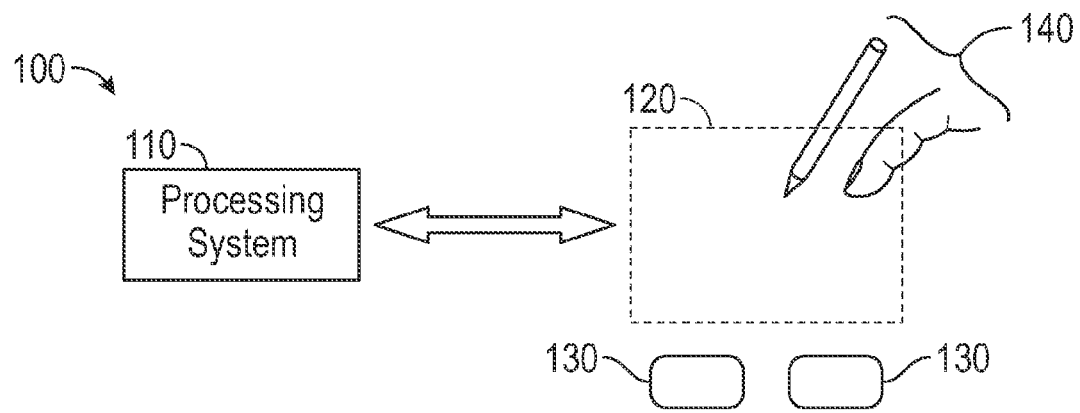
FIG. 1 is a block diagram of an exemplary electronic system that includes an input device and a processing system in accordance with an embodiment.

Turning now to the figures, FIG. 1 is a block diagram of an exemplary input device 100, in accordance with embodiments of the invention. The input device 100 may be configured to provide input to an electronic system (not shown). As used in this document, the term "electronic system" (or "electronic device") broadly refers to any system capable of electronically processing information. Some non-limiting examples of electronic systems include personal computers of all sizes and shapes, such as desktop computers, laptop computers, netbook computers, tablets, web browsers, e-book readers, and personal digital assistants (PDAs). Additional example electronic systems include composite input devices, such as physical keyboards that include input device 100 and separate joysticks or key switches. Further example electronic systems include peripherals such as data input devices (including remote controls and mice), and data output devices (including display screens and printers). Other examples include remote terminals, kiosks, and video game machines (e.g., video game consoles, portable gaming devices, and the like). Other examples include communication devices (including cellular phones, such as smart phones), and media devices (including recorders, editors, and players such as televisions, set-top boxes, music players, digital photo frames, and digital cameras). Additionally, the electronic system could be a host or a slave to the input device.

The input device 100 can be implemented as a physical part of the electronic system, or can be physically separate from the electronic system. As appropriate, the input device 100 may communicate with parts of the electronic system using any one or more of the following: buses, networks, and other wired or wireless interconnections. Examples include $I^2C$, SPI, PS/2, Universal Serial Bus (USB), Bluetooth, RF, and IRDA.

In a preferred embodiment, the input device 100 is implemented as a force enabled touchpad system including a processing system 110 and a sensing region 120. Sensing region 120 (also often referred to as "touchpad" or "touch sensor device") is configured to sense input provided by one or more input objects 140 in the sensing region 120. Example input objects include fingers, thumb, palm, and styli. The sensing region 120 is illustrated schematically as a rectangle; however, it should be understood that the sensing region may be of any convenient form and in any desired arrangement on the surface of and/or otherwise integrated with the touchpad.

Sensing region 120 encompasses any space above, around, in and/or near the input device 100 in which the input device 100 is able to detect user input (e.g., user input provided by one or more input objects 140). The sizes, shapes, and locations of particular sensing regions may vary widely from embodiment to embodiment. In some embodiments, the sensing region 120 extends from a surface of the input device 100 in one or more directions into space until signal-to-noise ratios prevent sufficiently accurate object detection. The distance to which this sensing region 120 extends in a particular direction, in various embodiments, may be on the order of less than a millimeter, millimeters, centimeters, or more, and may vary significantly with the type of sensing technology used and the accuracy desired. Thus, some embodiments sense input that comprises no contact with any surfaces of the input device 100, contact with an input surface (e.g. a touch surface) of the input device 100, contact with an input surface of the input device 100 coupled with some amount of applied force or pressure, and/or a combination thereof. In various embodiments, input surfaces may be provided by surfaces of casings within which the sensor electrodes reside, by face sheets applied over the sensor electrodes or any casings, etc. In some embodiments, the sensing region 120 has a rectangular shape when projected onto an input surface of the input device 100.

The input device is adapted to provide user interface functionality by facilitating data entry responsive to the position of sensed objects and the force applied by such objects. Specifically, the processing system is configured to determine positional information for objects sensed by a sensor in the sensing region. This positional information can then be used by the system to provide a wide range of user interface functionality. Furthermore, the processing system is configured to determine force information for objects from measures of force determined by the sensor in the sensing region. This force information can then also be used by the system to provide a wide range of user interface functionality, for example, by providing different user interface functions in response to different levels of applied force by objects in the sensing region.

Furthermore, the processing system may be configured to determine input information for more than one object sensed in the sensing region. Input information can be based upon a combination the force information, the positional information, the number of input objects in the sensing region and/or in contact with the input surface, and a duration the one or more input objects is touching or in proximity to the input surface. Input information can then be used by the system to provide a wide range of user interface functionality.

The input device is sensitive to input by one or more input objects (e.g. fingers, styli, etc.), such as the position of an input object within the sensing region. The sensing region encompasses any space above, around, in and/or near the input device in which the input device is able to detect user input (e.g., user input provided by one or more input objects). The sizes, shapes, and locations of particular sensing regions may vary widely from embodiment to embodiment. In some embodiments, the sensing region extends from a surface of the input device in one or more directions into space until signal-to-noise ratios prevent sufficiently accurate object detection. The distance to which this sensing region extends in a particular direction, in various embodiments, may be on the order of less than a millimeter, millimeters, centimeters, or more, and may vary significantly with the type of sensing technology used and the accuracy desired. Thus, some embodiments sense input that comprises no contact with any surfaces of the input device, contact with an input surface (e.g. a touch surface) of the input device, contact with an input surface of the input device coupled with some amount of applied force, and/or a combination thereof. In various embodiments, input surfaces may be provided by surfaces of casings within which the sensor electrodes reside, by face sheets applied over the sensor electrodes or any casings.

The input device 100 may utilize any combination of sensor components and sensing technologies to detect user input in the sensing region 120. The input device 100 comprises one or more sensing elements for detecting user input. As several non-limiting examples, the input device 100 may use capacitive, elastive, resistive, inductive, magnetic, acoustic, ultrasonic, and/or optical techniques.

Some implementations are configured to provide images that span one, two, three, or higher dimensional spaces. Some implementations are configured to provide projections of input along particular axes or planes.

In some resistive implementations of the input device 100, a flexible and conductive first layer is separated by one or more spacer elements from a conductive second layer.

During operation, one or more voltage gradients are created across the layers. Pressing the flexible first layer may deflect it sufficiently to create electrical contact between the layers, resulting in voltage outputs reflective of the point(s) of contact between the layers. These voltage outputs may be used to determine positional information.

In some inductive implementations of the input device 100, one or more sensing elements pick up loop currents induced by a resonating coil or pair of coils. Some combination of the magnitude, phase, and frequency of the currents may then be used to determine positional information.

In some capacitive implementations of the input device 100, voltage or current is applied to create an electric field. Nearby input objects cause changes in the electric field, and produce detectable changes in capacitive coupling that may be detected as changes in voltage, current, or the like.

Some capacitive implementations utilize arrays or other regular or irregular patterns of capacitive sensing elements to create electric fields. In some capacitive implementations, separate sensing elements may be ohmically shorted together to form larger sensor electrodes. Some capacitive implementations utilize resistive sheets, which may be uniformly resistive.

Some capacitive implementations utilize "self capacitance" (or "absolute capacitance") sensing methods based on changes in the capacitive coupling between sensor electrodes and an input object. In various embodiments, an input object near the sensor electrodes alters the electric field near the sensor electrodes, thus changing the measured capacitive coupling. In one implementation, an absolute capacitance sensing method operates by modulating sensor electrodes with respect to a reference voltage (e.g. system ground), and by detecting the capacitive coupling between the sensor electrodes and input objects.

Some capacitive implementations utilize "mutual capacitance" (or "transcapacitance") sensing methods based on changes in the capacitive coupling between sensor electrodes. In various embodiments, an input object near the sensor electrodes alters the electric field between the sensor electrodes, thus changing the measured capacitive coupling. In one implementation, a transcapacitive sensing method operates by detecting the capacitive coupling between one or more transmitter sensor electrodes (also "transmitter electrodes" or "transmitters") and one or more receiver sensor electrodes (also "receiver electrodes" or "receivers"). Transmitter sensor electrodes may be modulated relative to a reference voltage (e.g., system ground) to transmit transmitter signals. Receiver sensor electrodes may be held substantially constant relative to the reference voltage to facilitate receipt of resulting signals. A resulting signal may comprise effect(s) corresponding to one or more transmitter signals, and/or to one or more sources of environmental interference (e.g. other electromagnetic signals). Sensor electrodes may be dedicated transmitters or receivers, or may be configured to both transmit and receive.

In various embodiments, the input device further comprises one or more force sensors as part of an interface for an electronic system. The input device has a processing system, an input surface, sensing region and a single or multiple force sensors implemented proximate the sensing region. Furthermore, it should be noted that one or more force sensors may be provided inside or outside the perimeter of the input surface. The input device uses both the proximity sensor and the force sensor(s) to provide an interface for an electronic system.

It should also be understood that the input device may be implemented with a variety of different methods to determine force imparted onto the input surface of the input device. For example, the input device may include mechanisms disposed proximate the input surface and configured to provide an electrical signal representative of an absolute or a change in force applied onto the input surface. In some embodiments, the input device may be configured to determine force information based on a defection of the input surface relative to a conductor (e.g. a display screen underlying the input surface). In some embodiments, the input surface may be configured to deflect about one or multiple axis. In some embodiments, the input surface may be configured to deflect in a substantially uniform or non-uniform manner. In various embodiments, the force sensors may be based on changes in capacitance and/or changes in resistance.

In FIG. 1, a processing system 110 is shown as part of the input device 100. The processing system 110 is configured to operate the hardware of the input device 100 to detect input in the sensing region 120. The processing system 110 comprises parts of or all of one or more integrated circuits (ICs) and/or other circuitry components. For example, a processing system for a mutual capacitance sensor device may comprise transmitter circuitry configured to transmit signals with transmitter sensor electrodes, and/or receiver circuitry configured to receive signals with receiver sensor electrodes).

In some embodiments, the processing system 110 also comprises electronically-readable instructions, such as firmware code, software code, and/or the like. In some embodiments, components composing the processing system 110 are located together, such as near sensing element(s) of the input device 100. In other embodiments, components of processing system 110 are physically separate with one or more components close to sensing element(s) of input device 100, and one or more components elsewhere. For example, the input device 100 may be a peripheral coupled to a desktop computer, and the processing system 110 may comprise software configured to run on a central processing unit of the desktop computer and one or more ICs (perhaps with associated firmware) separate from the central processing unit.

As another example, the input device 100 may be physically integrated in a phone, and the processing system 110 may comprise circuits and firmware that are part of a main processor of the phone. In some embodiments, the processing system 110 is dedicated to implementing the input device 100. In other embodiments, the processing system 110 also performs other functions, such as operating display screens, driving haptic actuators, etc.

The processing system 110 may be implemented as a set of modules that handle different functions of the processing system 110. Each module may comprise circuitry that is a part of the processing system 110, firmware, software, or a combination thereof. In various embodiments, different combinations of modules may be used. Example modules include hardware operation modules for operating hardware such as sensor electrodes and display screens, data processing modules for processing data such as sensor signals and positional information, and reporting modules for reporting information. Further example modules include sensor operation modules configured to operate sensing element(s) to detect input, identification modules configured to identify gestures such as mode changing gestures, and mode changing modules for changing operation modes.

In some embodiments, the processing system 110 responds to user input (or lack of user input) in the sensing region 120 directly by causing one or more actions. Example actions include changing operation modes, as well as GUI actions such as cursor movement, selection, menu navigation, and other functions. In some embodiments, the processing system 110 provides information about the input (or lack of input) to some part of the electronic system (e.g. to a central processing system of the electronic system that is separate from the processing system 110, if such a separate central processing system exists).

In some embodiments, some part of the electronic system processes information received from the processing system 110 to act on user input, such as to facilitate a full range of actions, including mode changing actions and GUI actions. The types of actions may include, but are not limited to, pointing, tapping, selecting, clicking, double clicking, panning, zooming, and scrolling. Other examples of possible actions include an initiation and/or rate or speed of an action, such as a click, scroll, zoom, or pan.

For example, in some embodiments, the processing system 110 operates the sensing element(s) of the input device 100 to produce electrical signals indicative of input (or lack of input) in the sensing region 120. The processing system 110 may perform any appropriate amount of processing on the electrical signals in producing the information provided to the electronic system. For example, the processing system 110 may digitize analog electrical signals obtained from the sensor electrodes. As another example, the processing system 110 may perform filtering or other signal conditioning.

As yet another example, the processing system 110 may subtract or otherwise account for a baseline, such that the information reflects a difference between the electrical signals and the baseline. As yet further examples, the processing system 110 may determine positional information, recognize inputs as commands, recognize handwriting, and the like.

"Positional information" as used herein broadly encompasses absolute position, relative position, velocity, acceleration, and other types of spatial information. Exemplary "zero-dimensional" positional information includes near/far or contact/no contact information. Exemplary "one-dimensional" positional information includes positions along an axis. Exemplary "two-dimensional" positional information includes motions in a plane. Exemplary "three-dimensional" positional information includes instantaneous or average velocities in space. Further examples include other representations of spatial information. Historical data regarding one or more types of positional information may also be determined and/or stored, including, for example, historical data that tracks position, motion, or instantaneous velocity over time.

Likewise, the term "force information" as used herein is intended to broadly encompass force information regardless of format. For example, the force information can be provided for each input object as a vector or scalar quantity. As another example, the force information can be provided as an indication that determined force has or has not crossed a threshold amount. As other examples, the force information can also include time history components used for gesture recognition. As will be described in greater detail below, positional information and force information from the processing systems may be used to facilitate a full range of interface inputs, including use of the proximity sensor device as a pointing device for selection, cursor control, scrolling, and other functions.

Likewise, the term "input information" as used herein is intended to broadly encompass temporal, positional and force information regardless of format, for any number of input objects. In some embodiments, input information may be determined for individual input objects. In other embodiments, input information comprises the number of input objects interacting with the input device.

In some embodiments, the input device 100 is implemented with additional input components that are operated by the processing system 110 or by some other processing system. These additional input components may provide redundant functionality for input in the sensing region 120, or some other functionality. FIG. 1 shows buttons 130 near the sensing region 120 that can be used to facilitate selection of items using the input device 100. Other types of additional input components include sliders, balls, wheels, switches, and the like. Conversely, in some embodiments, the input device 100 may be implemented with no other input components.

In some embodiments, the input device 100 comprises a touch screen interface, and the sensing region 120 overlaps at least part of an active area of a display screen. For example, the input device 100 may comprise substantially transparent sensor electrodes overlaying the display screen and provide a touch screen interface for the associated electronic system. The display screen may be any type of dynamic display capable of displaying a visual interface to a user, and may include any type of light emitting diode (LED), organic LED (OLED), cathode ray tube (CRT), liquid crystal display (LCD), plasma, electroluminescence (EL), or other display technology. The input device 100 and the display screen may share physical elements. For example, some embodiments may utilize some of the same electrical components for displaying and sensing. As another example, the display screen may be operated in part or in total by the processing system 110.

It should be understood that while many embodiments of the invention are described in the context of a fully functioning apparatus, the mechanisms of the present invention are capable of being distributed as a program product (e.g., software) in a variety of forms. For example, the mechanisms of the present invention may be implemented and distributed as a software program on information bearing media that are readable by electronic processors (e.g., non-transitory computer-readable and/or recordable/writable information bearing media readable by the processing system 110).

Additionally, the embodiments of the present invention apply equally regardless of the particular type of medium used to carry out the distribution. Examples of non-transitory, electronically readable media include various discs, memory sticks, memory cards, memory modules, and the like. Electronically readable media may be based on flash, optical, magnetic, holographic, or any other storage technology.

As noted above, the embodiments of the invention can be implemented with a variety of different types and arrangements of capacitive sensor electrodes. To name several examples, the input device can be implemented with electrode arrays that are formed on multiple substrate layers, typically with the electrodes for sensing in one direction (e.g., the "X" direction) formed on a first layer, while the electrodes for sensing in a second direction (e.g., the "Y" direction are formed on a second layer. In other embodiments, the sensor electrodes for both the X and Y sensing can be formed on the same layer. In yet other embodiments, the sensor electrodes can be arranged for sensing in only one direction, e.g., in either the X or the Y direction.

In still another embodiment, the sensor electrodes can be arranged to provide positional information in polar coordinates, such as "r" and "θ" as one example. In these embodiments the sensor electrodes themselves are commonly arranged in a circle or other looped shape to provide "θ", with the shapes of individual sensor electrodes used to provide "r".

Also, a variety of different sensor electrode shapes can be used, including electrodes shaped as thin lines, rectangles, diamonds, wedge, etc. Finally, a variety of conductive materials and fabrication techniques can be used to form the sensor electrodes. As one example, the sensor electrodes are formed by the deposition and etching of conductive ink on a substrate.

Figure 2:
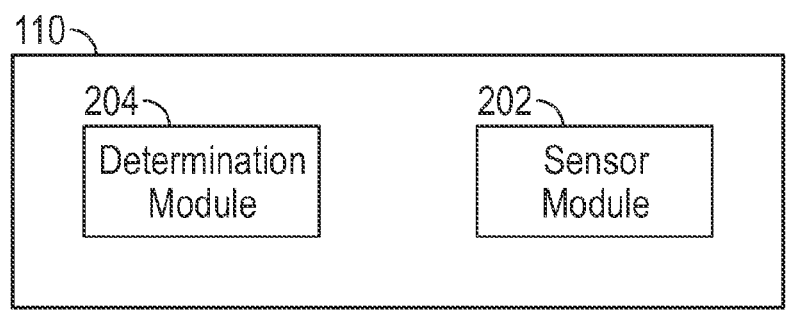
FIG. 2 is a schematic view of an exemplary processing system in accordance with an embodiment.

Referring now to FIGS. 1 and 2, the processing system 110 includes a sensor module 202 and a determination module 204. Sensor module 202 is configured to receive resulting signals from the sensor electrodes associated with sensing region 120. Determination module 204 is configured to process the data, and to determine positional information and the force information for one or more input objects in the sensing region.

Figure 3:
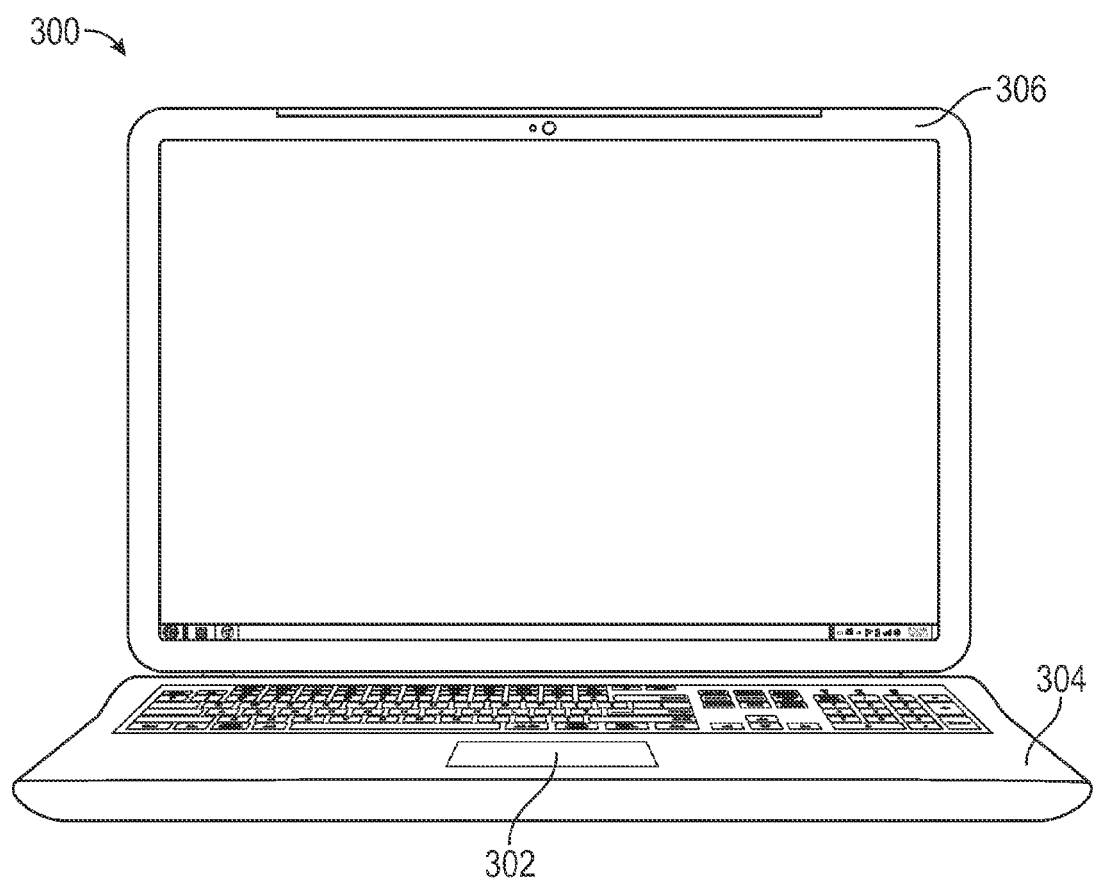
FIG. 3 is a perspective view of an electronic system illustrating conventional "B" and "C" covers in accordance with an embodiment.

Referring now to FIG. 3, the present invention may be employed in the context of an electronic system 300 such as a laptop or tablet computer, or any other electronic device employing a click pad 302. In the illustrated example, the click pad 302 may be installed into the keyboard deck 304, also referred to as the "C" cover. Those skilled in the art will appreciate that a conventional lap top computer includes the "C" cover 304, a "B" cover 306 (corresponding to the display), an "A" cover (hidden from view in FIG. 3) disposed on the opposite side of the display surface, and a "D" cover on the underside of the deck 304 (also hidden from view in FIG. 3).

In various embodiments, the term "top mount" refers to the notion that the click pad 302 may be installed from the top of the deck 304, as opposed installing the click pad from underneath the C cover (i.e., between the C and D covers. The manner in which the click pad may be installed from above the C cover will now be described in conjunction with FIGS. 4 and 5.

Figure 4:
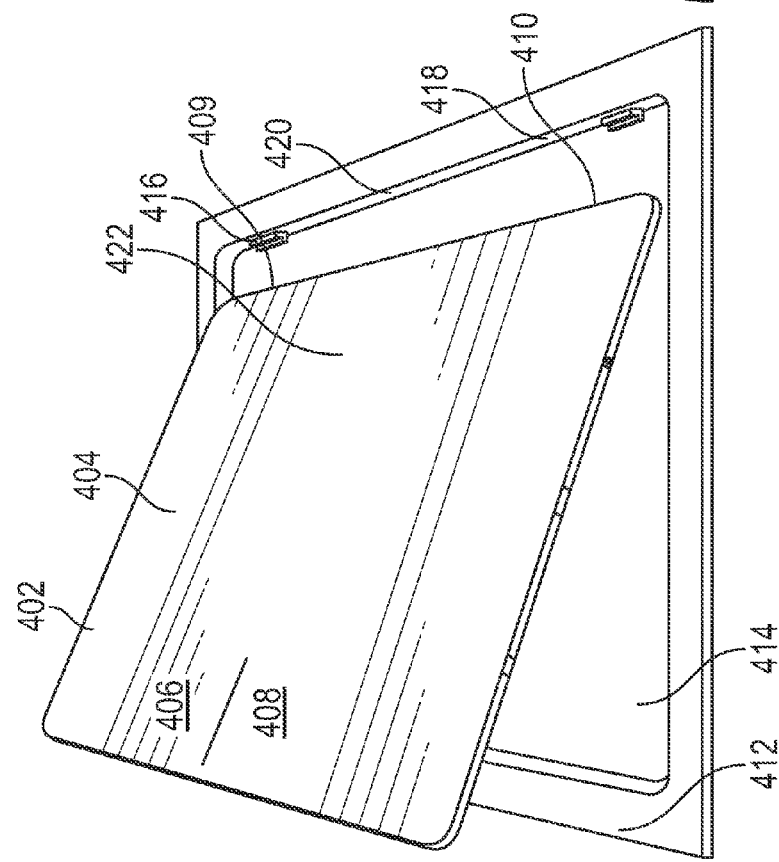
FIG. 4 is a perspective view of a top mount click pad module being installed in a basin in accordance with an embodiment.

FIG. 4 is a perspective view of a top mount click pad module 402 being installed in a basin 412 formed in a keyboard deck in accordance with an embodiment. More particularly, the click pad module 402 comprises a touch surface 404 including first and second button regions 406 and 408. In order to secure the module in the basin upon installation, the click pad module 402 includes one or more projections or tabs 409, 410 extending from a rear edge 422 of the module. The basin 412 includes corresponding slots 416, 418 disposed along a rear edge 420 of the basin 412 for receiving the tabs 408, 410, respectively.

Figure 5:
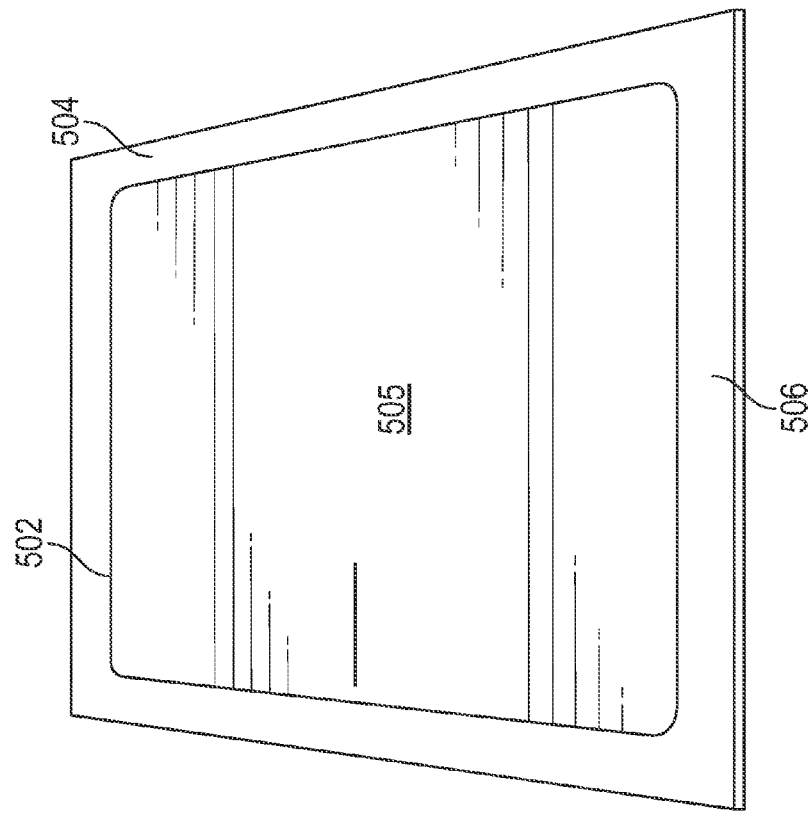
FIG. 5 is a perspective view of the top mount click pad module of FIG. 4 shown in the installed position in accordance with an embodiment.

FIG. 5 is a perspective view of the top mount click pad module of FIG. 4 shown in the installed position. Specifically, a click pad module 502 is shown installed within a basin 504, with the tabs (not shown in FIG. 5) received within the corresponding slots (also not shown) of basin 504. In the installed position shown, the top surface 505 of the click pad module 502 may be essentially coplanar with the top surface 506 of the basin; alternatively, the surface 505 of the module may be slightly recessed (downwardly) with respect to the top surface 506 of the basin, thereby creating a tactile circumferential lip surrounding the module.

Figure 6:
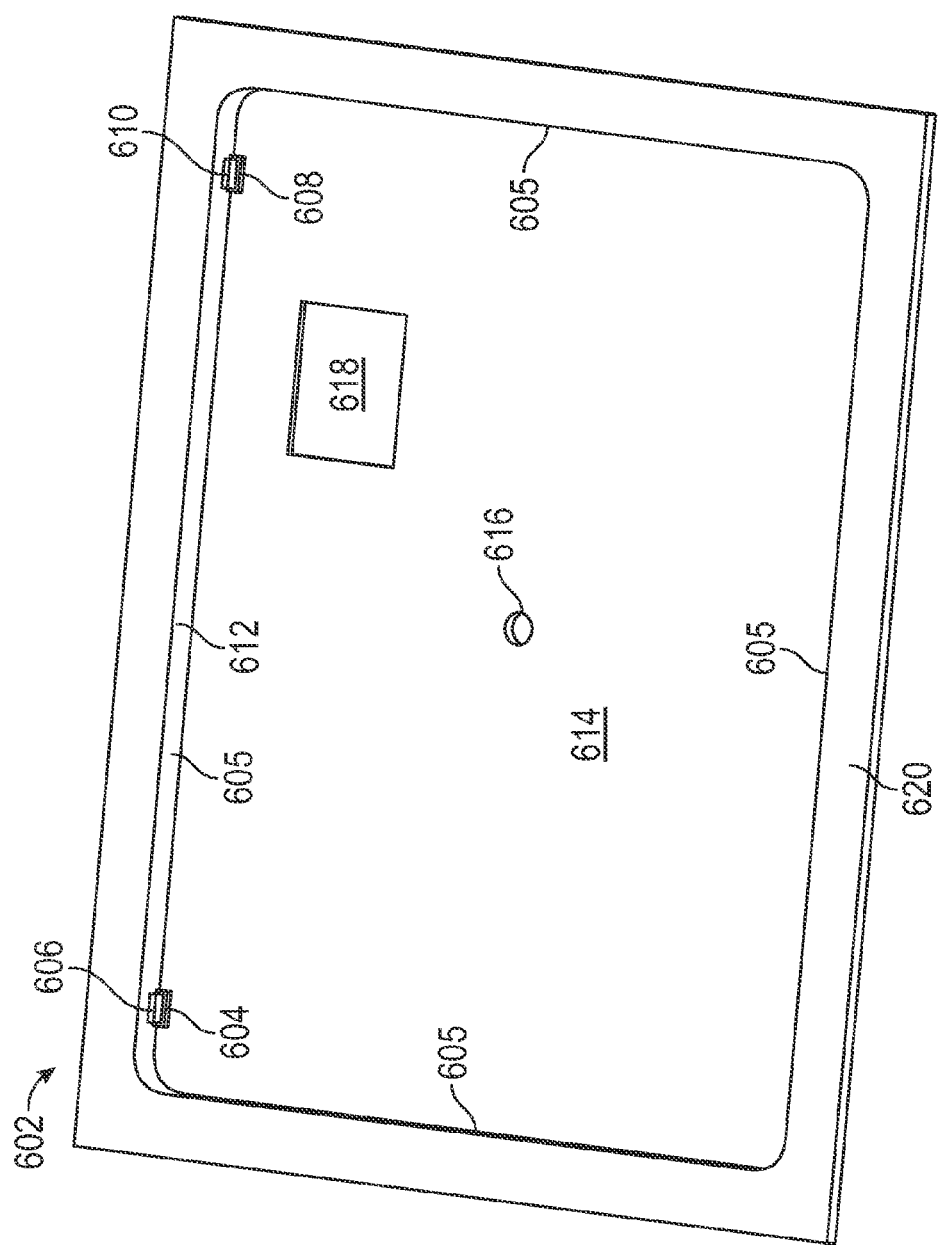
FIG. 6 is a perspective view of a basin including installation slots and eves formed in a keyboard deck in accordance with an embodiment.

FIG. 6 is a perspective detail view of a basin 602 having a floor 615 and vertical sidewalls 605 formed in a keyboard deck 620. The basin 602 includes a first slot 604 having an overhang or eve 606 for securely holding a corresponding tab or extension of a click pad module (not shown in FIG. 6), and a second slot 608 having an overhang or eve 610 disposed along a rear edge 612. Alternatively, the basin may include a greater number of slots, or may include one or more elongated slots (with or without a corresponding eve) extending along the rear edge 612. The basin 602 further includes a fastener hole 616 (e.g., a screw hole) and an aperture 618 for facilitating electronic communication between the installed click pad and a processing system associated with the electronic system.

Figure 7:
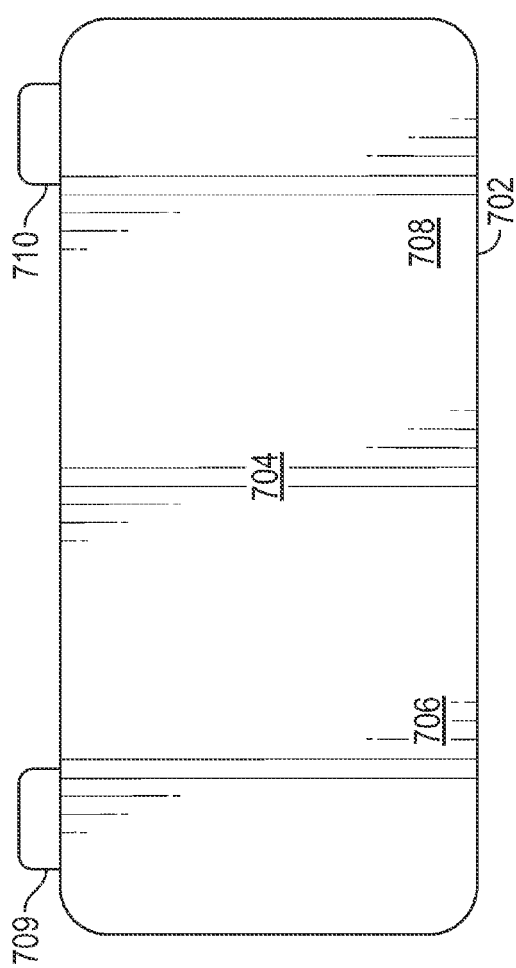
FIG. 7 is a top view of a top mount click pad module showing tabs configured to be inserted into the slots and underneath the eves of FIG. 6 in accordance with an embodiment.

FIG. 7 is a top view of a click pad module 702 including a first tab 709, a second tab 710, and a touch surface 704 including respective button regions 706 and 708. The tabs 709, 710 are advantageously configured to be inserted into the slots and underneath the eves of FIG. 6 to thereby secure the module within the basin.

Figure 8:
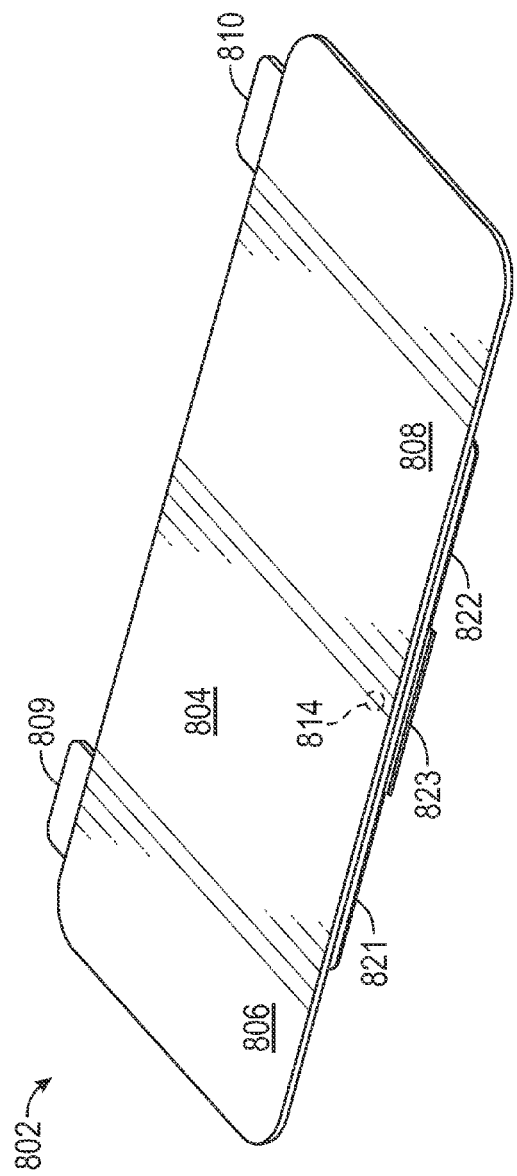
FIG. 8 is a perspective view of the click pad module of FIG. 7 in accordance with an embodiment.

FIG. 8 is a perspective view of the click pad module of FIG. 7 in accordance with an embodiment. More particularly, FIG. 8 depicts a click pad module 802 including respective tabs 809, 810, and a touch surface 804 including respective button regions 806 and 808. As described in greater detail below in connection with FIGS. 9 and 10, a bracket 823 including resiliently deformable wings 821 and 822 extends underneath and spaced apart from the module with a tact switch 824 disposed between the underside of the click pad and the bracket 823. When pressed downwardly by an input object, the surface 804 deflects, actuating the tact switch 824 to indicate a button press by also detecting the position of the input object, the electronic system may determine whether the button press corresponds to left button 806 or right button 808.

Figure 9:
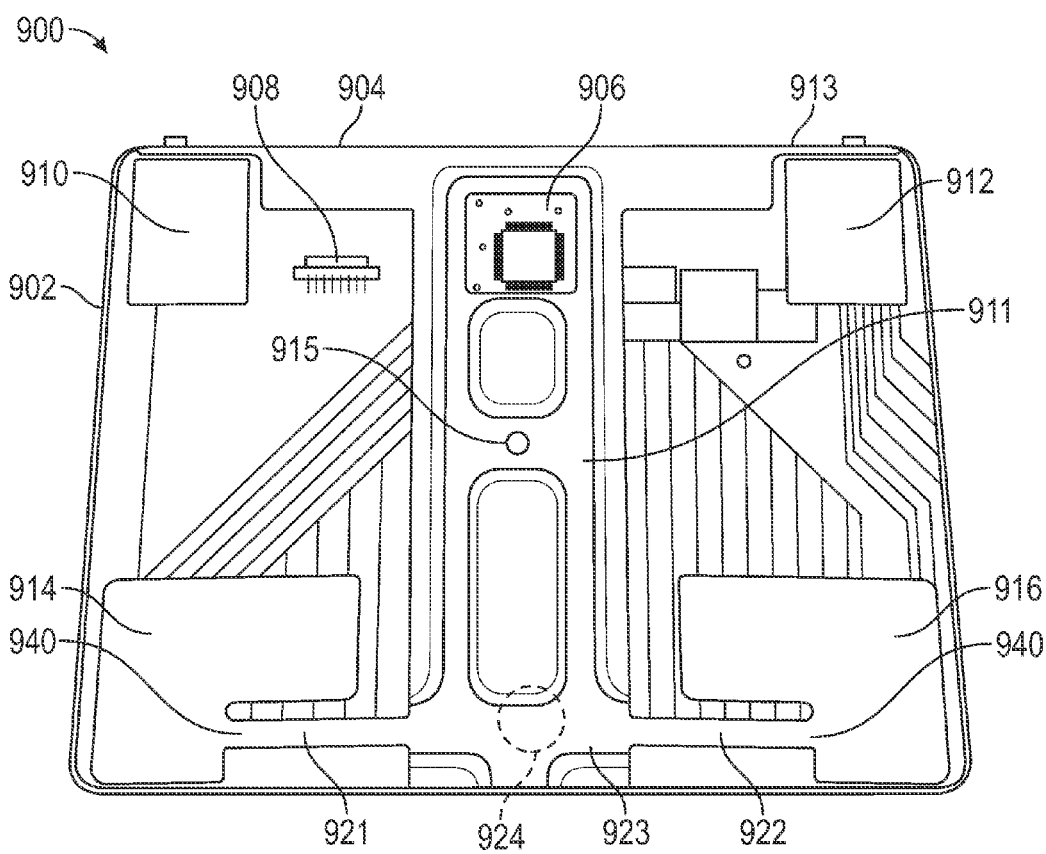
FIG. 9 is a bottom view of the click pad module of FIG. 7 showing the hinged support substrate in accordance with an embodiment.

FIG. 9 is a bottom view of a click pad module 900 including a sensor substrate 902 and a bracket 904. The sensor substrate may comprise a glass reinforced epoxy laminate (FR4), a polyethylene terephthalate (PET) circuit board, or the like. The sensor substrate 902 includes an on board processor 906 and a connector 908 configured to be communicatively coupled to a processing system associated with the electronic system to which the click pad module is mounted.

With continued reference to FIG. 9, the bracket 904 includes a first hinge portion comprising rear pads 910 and 912, a hinge 913, and a second hinge portion 911 secured to the basin floor by a fastener via a screw hole 915. The second hinge portion 911 extends forwardly from the hinge 913 to wings 921, 922 which are connected to respective front pads 914, 916 through embossed portions 940. As such, the second hinge portion 911 and wings 921 and 922 are secured to the basin floor, while the pads 910, 912, 914, and 916 are secured (e.g., adhesively) to the underside of the sensor substrate 902.

In the un-pressed state, the pads 910, 912, 914, and 916 remain essentially parallel to and spaced apart (in the Z direction) from the second hinge portion 911 (and wings 921 and 922). When pressed by an input object, the sensor substrate 902 is urged downwardly toward the basin floor, flexing the wings 921, 922, decreasing the distance between a front portion 923 of the bracket 904 and the sensor substrate 902. A tact switch 924 (hidden from view in FIG. 9) is disposed between the front portion 923 and the underside of the sensor substrate 902 to detect the downward deflection.

In an embodiment, the bracket 902, including the hinge 913, the second hinge portion 911, the wings 921, 922, front portion 923, and pads 910, 912, 914, and 916 are made from a single piece of material, for example, a stamped metallic sheet. In a further embodiment, one or more of the hinge 913, the tact switch 924, and the embossed wings 921 and 922 provide a return mechanism to restore the sensor substrate 902 to its nominal position following a button press.

Figure 10:
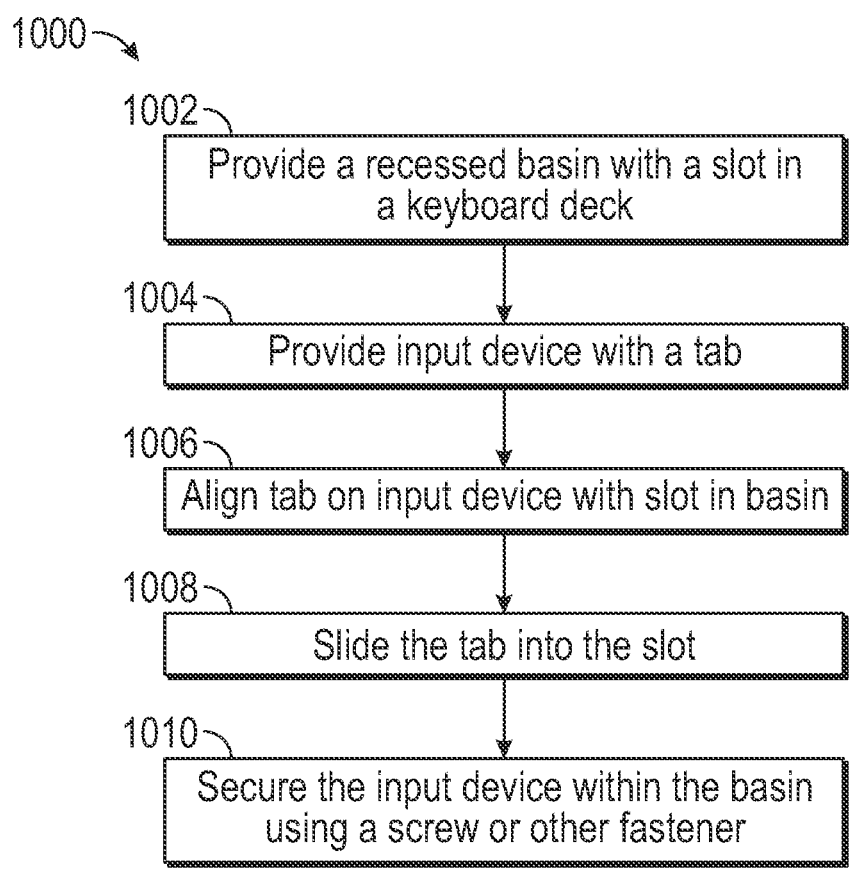
FIG. 10 is a flow chart illustrating a method of installing a top mount click module into a basin formed in a keyboard deck in accordance with various embodiments.

FIG. 10 is a flow chart of a method 1000 of installing a top mount click module into a basin formed in a keyboard deck in accordance with various embodiments. More particularly, the method 1000 includes: providing (Task 1002) a recessed basin having a slot in a keyboard deck of an electronic system; providing (Task 1004) an input device having a tab configured to be inserted into the slot; aligning (Task 1006) the tab with the slot; sliding (Task 1008) the tab into the slot, thereby sliding the input device into alignment with the basin; and securing (Task 1010) the input device to the basin using at least one screw.

An input device is thus provided for use with an electronic system of the type including a substantially planar deck having a basin extending downwardly from the deck and comprising at least one slot. The input device includes: a downwardly deflectable component including an input surface configured to be touched by input objects and a capacitive sensor layer configured to sense positional information of the input objects; a hinge having a first hinged component comprising at least one pad coupled to a bottom surface of the deflectable component, a second hinged component configured to be secured to the basin, and at least one tab configured to be inserted into the at least one slot; and an actuation element disposed between the first and second hinged components and configured to detect deflection of the deflectable component in response to force applied to the input surface by an input object.

In an embodiment, the actuation element comprises at least one of: a mechanical switch; an electronic switch; a resistive sensor; a capacitive sensor; a contact switch; a haptic sensor; a piezoelectric switch; a force sensor; a proximity switch; and a proximity sensor.

In an embodiment, the at least one slot comprises an eve, and further wherein the tab is configured to slide underneath the eve.

In an embodiment, the at least one slot comprises first and second slots, and the at least one tab comprises first and second tabs configured to be received within the first and second slots, respectively.

In an embodiment, the at least one slot comprises an elongated slot along an edge of the basin, and further wherein the at least one tab comprises an elongated tab configured to be received within the elongated slot.

In an embodiment, the second hinged component is configured to be secured to the basin by at least one fastener.

In an embodiment, the at least one fastener comprises a single screw.

In an embodiment, the deck comprises a keyboard surface of the electronic system, and the single screw is configured to secure the second hinged component to the basin by extending upwardly through the underside of the basin.

In an embodiment, the first and second hinged components are formed from a single piece of metal.

In an embodiment, the capacitive sensor layer comprises one of an FR4 composite circuit board, polyethylene terephthalate (PET), PCB, and a printed circuit board; and the first hinged component is secured to the capacitive sensor layer with adhesive.

In an embodiment, the hinge is further configured to provide a restoring force responsive to force applied by an input object.

In an embodiment, the input device further includes a processing system communicatively coupled to the actuation element and the capacitive sensor layer, the processing system configured to determine positional information for the input objects and deflection of the deflectable component.

In an embodiment, the second hinged component comprises a spring mechanism configured to provide a restoring force responsive to force applied by an input object.

In an embodiment, the hinge is configured to pivotably mount a first edge of the deflectable component to a first edge of the basin, and further wherein the spring mechanism is disposed proximate a second edge of the basin opposite the first edge of the basin.

In an embodiment, the spring mechanism is substantially planar and includes at least one of an embossed segment and a leaf spring.

An input device is also provided which includes: a deflectable component including a proximity sensor configured to sense positional information for an input object; a hinge configured to pivotably mount a first edge of the deflectable component to a basin formed within a chassis of an electronic system and to facilitate deflection of the deflectable component in response to force applied by the input object to the cover layer; at least one tab extending from the hinge and configured to engage a slot in the basin; a spring mechanism configured to provide a restoring force responsive to the applied force; and a processing system configured to determine positional information for the input objects and deflection of the deflectable component.

In an embodiment, the click pad also includes a tact switch mounted to the deflectable component and configured to detect deflection of the deflectable component and provide tactile feedback to the input object.

In an embodiment, the basin includes an aperture; and the deflectable component includes an electrical connector aligned with the aperture and communicatively coupled to the processing system.

In an embodiment, the hinge is formed from a single piece of metal comprising a first hinged component coupled to a bottom surface of the deflectable component, a second hinged component fastened to the basin, and the spring mechanism.

A method of top mounting an input device into an electronic system is also provided. The method includes: providing a recessed basin on a keyboard deck of an electronic system, the recessed basin having vertical sidewalls and at least one slot having an overhanging eve in a rear sidewall edge; providing an input device comprising a capacitive sensor layer, a hinge having a first hinged component coupled to the capacitive sensor layer, a second hinged component configured to be secured to the basin, and at least one tab configured to be inserted into the at least one slot; sliding the at least one tab under the eve and into the at least one slot; and securing the second hinged component to the basin using at least one screw.

Thus, the embodiments and examples set forth herein were presented in order to best explain the present invention and its particular application and to thereby enable those skilled in the art to make and use the invention. However, those skilled in the art will recognize that the foregoing description and examples have been presented for the purposes of illustration and example only. The description as set forth is not intended to be exhaustive or to limit the invention to the precise form disclosed. Other embodiments, uses, and advantages of the invention will be apparent to those skilled in art from the specification and the practice of the disclosed invention.

What is claimed is:

1. An input device for use with an electronic system, the input device comprising:
   a substantially planar deck;
   a basin comprising a top, a floor, and at least one slot proximate the floor of the basin, wherein the basin is disposed within the substantially planar deck and extends downwardly from the top of the basin to the floor of the basin; and
   a hardware module disposed inside the basin, the hardware module comprising:
      a downwardly deflectable component including an input surface configured to be touched by an input object and a capacitive sensor layer configured to sense positional information of the input object;
      a hinge having a first hinged component comprising at least one pad coupled to a bottom surface of the downwardly deflectable component, a second hinged component configured to be secured to the basin, and at least one tab configured to be inserted into the at least one slot of the basin; and
      an actuation element disposed between the first and second hinged components and configured to detect deflection of the downwardly deflectable component in response to a force applied to the input surface by the input object.

2. The input device of claim 1, wherein the actuation element comprises at least one of: a mechanical switch; an electronic switch; a resistive sensor; a capacitive sensor; a contact switch; a haptic sensor; a piezoelectric switch; a force sensor; a proximity switch; and a proximity sensor.

3. The input device of claim 1, wherein the at least one slot of the basin comprises an eve, and further wherein the at least one tab is configured to slide underneath the eve.

4. The input device of claim 1, wherein the at least one slot of the basin comprises first and second slots, and the at least one tab comprises first and second tabs configured to be received within the first and second slots, respectively.

5. The input device of claim 1, wherein the at least one slot of the basin comprises an elongated slot along an edge of the basin, and further wherein the at least one tab comprises an elongated tab configured to be received within the elongated slot.

6. The input device of claim 1, wherein the second hinged component is configured to be secured to the basin by at least one fastener.

7. The input device of claim 6, wherein the at least one fastener comprises a single screw.

8. The input device of claim 7, wherein the substantially planar deck comprises a keyboard surface of the electronic system, and the single screw is configured to secure the second hinged component to the basin by extending upwardly through the underside of the basin.

9. The input device of claim 1, wherein the first and second hinged components are formed from a single piece of metal.

10. The input device of claim 1, wherein:
    the capacitive sensor layer comprises one of: an FR4 composite circuit board; polyethylene terephthalate (PET); PCB; and a printed circuit board; and
    the first hinged component is secured to the capacitive sensor layer with adhesive.

11. The input device of claim 1, wherein the hinge is further configured to provide a restoring force responsive to the force applied to the input surface by the input object.

12. The input device of claim 1, further comprising a processing system communicatively coupled to the actuation element and the capacitive sensor layer, the processing system configured to determine positional information for the input objects and deflection of the downwardly deflectable component.

13. The input device of claim 1, wherein the second hinged component comprises a spring mechanism configured to provide a restoring force responsive to force applied by an input object.

14. The input device of claim 13, wherein the hinge is configured to pivotably mount a first edge of the downwardly deflectable component to a first edge of the basin, and further wherein the spring mechanism is disposed proximate a second edge of the basin opposite the first edge of the basin.

15. The input device of claim 13, wherein the spring mechanism is substantially planar and includes at least one of an embossed segment and a leaf spring.

16. An input device comprising:
    a substantially planar deck;
    a basin formed within a chassis of an electronic system, wherein the basin comprises a top, a floor, and a slot proximate the floor of the basin, and wherein the basin is disposed within the substantially planar deck and extends downwardly from the top of the basin to the floor of the basin; and
    a hardware module disposed inside the basin, the hardware module comprising:
       a deflectable component including a proximity sensor configured to sense positional information for an input object;
       a hinge configured to pivotably mount a first edge of the deflectable component to the basin and to facilitate deflection of the deflectable component in response to force applied by the input object to a cover layer of the hardware module;
       at least one tab extending from the hinge and configured to engage the slot of the basin;
       a spring mechanism configured to provide a restoring force responsive to the applied force; and
       a processing system configured to determine positional information for the input objects and deflection of the deflectable component.

17. The input device of claim 16, further comprising a tact switch mounted to the deflectable component and configured to detect deflection of the deflectable component and provide tactile feedback to the input object.

18. The input device of claim 16, wherein:
    the basin includes an aperture; and
    the deflectable component includes an electrical connector aligned with the aperture and communicatively coupled to the processing system.

19. The input device of claim 16, wherein:
    the hinge is formed from a single piece of metal comprising a first hinged component coupled to a bottom surface of the deflectable component, a second hinged component fastened to the basin, and the spring mechanism.

20. A method of top mounting an input device into an electronic system, comprising:
    providing a recessed basin disposed within a keyboard deck of an electronic system, the recessed basin having a top, vertical sidewalls, a floor, and at least one slot having an overhanging eve in a rear sidewall edge, wherein the recessed basin extends downwardly from the top of the recessed basin to the floor of the recessed basin;

providing a hardware module comprising a capacitive sensor layer, a hinge having a first hinged component coupled to the capacitive sensor layer, a second hinged component configured to be secured to the recessed basin, and at least one tab configured to be inserted into the at least one slot of the recessed basin;

sliding the at least one tab under the eve and into the at least one slot of the recessed basin; and securing the second hinged component to the recessed basin using at least one screw.

\* \* \* \* \*